Figure 3:
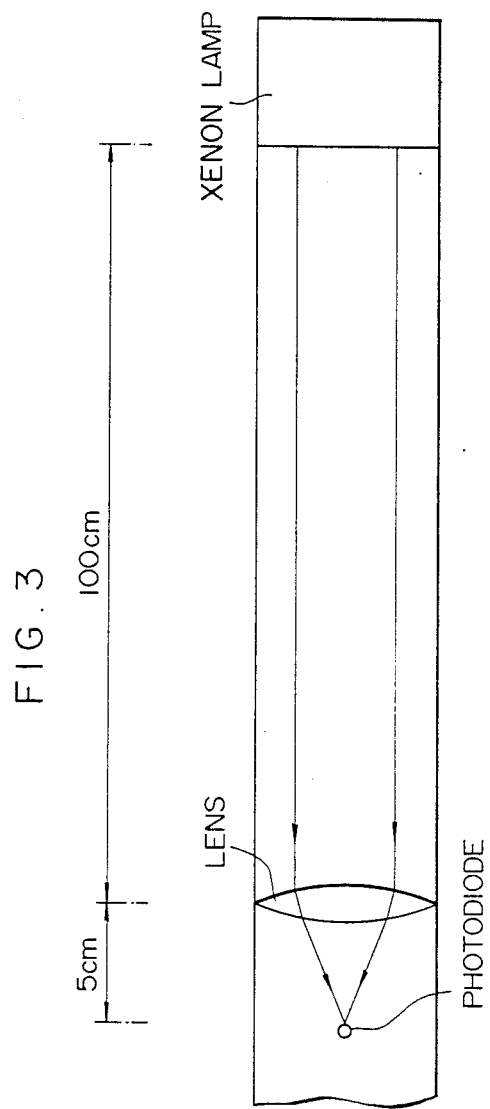

United States Patent [19]

Yanagihara et al.

[11] Patent Number: 4,632,844
[45] Date of Patent: Dec. 30, 1986

[54] OPTICAL PRODUCT HAVING A THIN FILM ON THE SURFACE

[75] Inventors: Kenji Yanagihara, Yokohama; Tetsuo Itoh, Machida; Mituo Kimura, Yokohama; Masahiro Niinomi, Machida, all of Japan

[73] Assignee: Japan Synthetic Rubber Co., Ltd., Tokyo, Japan

[21] Appl. No.: 694,996

[22] Filed: Jan. 25, 1985

[30] Foreign Application Priority Data

Feb. 4, 1984 [JP] Japan ................................ 59-19198

[51] Int. Cl.$^4$ .............................................. B05D 3/06
[52] U.S. Cl. ............................... 427/38; 350/321;
350/600; 350/642; 351/160 H; 427/40; 427/41;
427/162; 427/164; 427/165; 427/166; 427/255;
427/255.3
[58] Field of Search ................... 427/38, 162, 40, 164,
427/41, 166, 255.3, 163, 165, 255, 255.1, 255.6;
350/444, 321, 600, 642; 351/177, 160 H;
428/913

[56] References Cited

U.S. PATENT DOCUMENTS

| | | | |
|---|---|---|---|
| 4,312,575 | 1/1982 | Peyman et al. | 427/41 |
| 4,402,993 | 9/1983 | Aisenberg et al. | 427/38 |
| 4,429,024 | 1/1984 | Ueno et al. | 427/41 |
| 4,524,089 | 6/1985 | Hague et al. | 427/38 |

FOREIGN PATENT DOCUMENTS 59-19198  4/1985  Japan .

Primary Examiner—Sadie L. Childs
Attorney, Agent, or Firm—Oblon, Fisher, Spivak, McClelland & Maier

[57] ABSTRACT

An optical product having a thin film on the surface which is obtained by subjecting a mixed gas of oxygen and a hydrocarbon compound having a double bond to plasma polymerization in the presence of an optical product, thereby forming on the surface of the optical product a thin film of a reaction product of said plasma polymerization. Said optical product having a thin film on the surface has excellent resistance to fogging due to adhesion of water drops when used in gas phase, excellent resistance to adhesion of air bubbles when used in liquid phase, high resistance to being stained by oils and fats and an excellent removability of stains due to oils and fats.

15 Claims, 3 Drawing Figures

F I G. 1
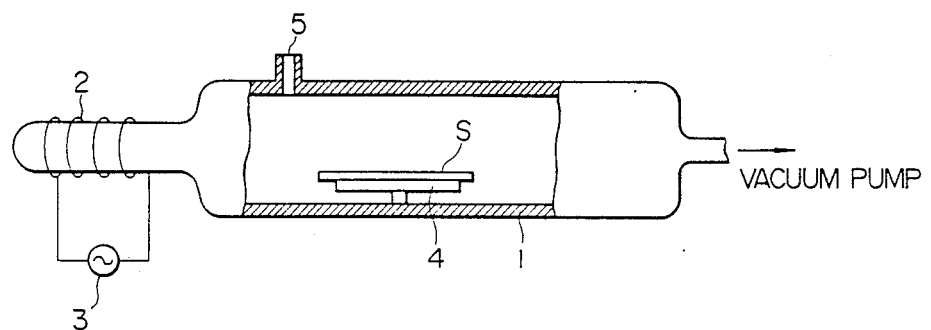
F I G. 2
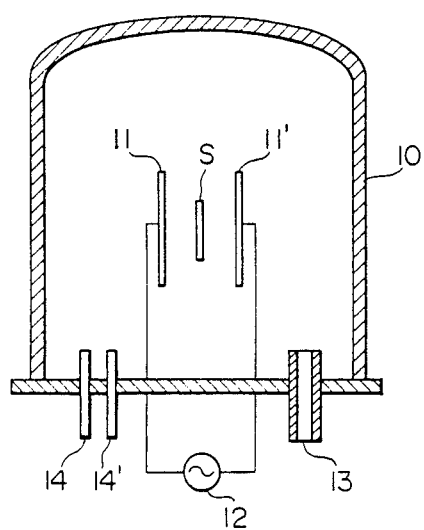

OPTICAL PRODUCT HAVING A THIN FILM ON THE SURFACE

This invention relates to an optical product having a thin film on the surface. It has heretofore been desired that many optical products such as mirror, lens, plane or curved surface glass, prism and the like have resistance to fogging due to adhesion of water drops when used in a gas phase and resistance to adhesion of air bubbles when used in a liquid phase such as water or the like, are resistant to being stained by oils and fats and are excellent in removability of stains due to oils and fats. One effective means for improving these properties is to impart hydrophilicity to the surfaces of optical products.

As one of the methods for imparting hydrophilicity to the surfaces of optical products, there is known a method by which an optical product is oxidized in an oxygen plasma, whereby its surface is made hydrophilic. However, because of a high affinity for electrons, oxygen atoms or molecules are easily converted to negative ions in the plasma, and an auto ionization occurs. Accordingly, the state of oxygen plasma in the reaction vessel cannot be uniquely controlled by an energy supplied from outside such as a high frequency electric power, a microwave electric power or the like and becomes instable because densely or sparsely ionized portions are formed and these portions vibrate. For these reasons, the method of imparting hydrophilicity by means of an oxygen plasma has a difficulty in applying a uniform treatment to a large surface area. In addition, this method is disadvantageous in that the hydrophilicity imparted changes and deteriorates with the lapse of time.

Other methods are also known for imparting hydrophilicity to the surfaces of optical products such as (1) a method in which the surface of an optical product is chemically modified by immersing an optical product composed of a polymer in a solution having a strong oxidative effect or by introducing a hydrophilic functional group into molecules of a polymer which is later formed into an optical product and (2) a method in which the surface of an optical product is photo-oxidized by exposing an optical product composed of a polymer to an ultraviolet light. However, all these methods have drawbacks in that materials usable for optical products are restricted; the optical characteristics of optical products are changed by the surface treatment; and the hydrophilicity imparted changes with the lapse of time.

An object of this invention is to provide, by conducting a plasma polymerization, an optical product which has overcome the above-mentioned drawbacks and has on the surface a uniform thin film possessing excellent and stable hydrophilicity and not affecting the original optical characteristics of the optical product.

Other objects and advantages of this invention will become apparent from the following description and the accompanying drawings. In the accompanying drawings, FIGS. 1 and 2 show examples of apparatus used in the plasma polymerization of this invention. FIG. 1 is an apparatus of discharge tube type and FIG. 2 is an apparatus of bell jar type. In these figures, 1 is a reaction vessel of discharge tube type; 2 is a coil; 3 and 12 are power sources; 4 is a supporting table; 5 is a gas inlet; 10 is a reaction vessel of bell jar type; 11 and 11' are electrodes, 13 is an exhaust gas pipe and 14 and 14' are conduits for reaction gas.

FIG. 3 is an apparatus used in the Examples of this invention for examining the degree of reduction of the beam-condensing ability of a convex lens due to adhesion of water drops onto the surface of the lens.

According to this invention, there is provided an optical product having a thin film on the surface obtained by subjecting a mixed gas comprising oxygen and a hydrocarbon compound having at least one double bond (hereinunder referred to simply as a hydrocarbon) and to plasma polymerization in the presence of an optical product, thereby forming on the surface of the optical product a thin film of a reaction product of said plasma polymerization (this film is hereinunder referred to as a plasma polymerization product film).

The hydrocarbon used in this invention includes unsaturated aliphatic hydrocarbon compounds and cyclic unsaturated hydrocarbon compounds.

The unsaturated aliphatic hydrocarbon compound is represented by the general formula (A):

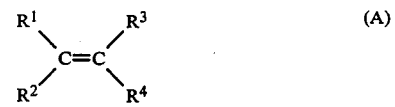

(A)

wherein $R^1$, $R^2$, $R^3$ and $R^4$, which may be the same or different, are hydrogen atoms, alkyl groups such as methyl, ethyl, propyl and the like, or alkenyl groups such as vinyl, propenyl, allyl and the like, and includes ethylene, propylene, 2-butene, isobutylene, 2-methyl-2-butene, 2,3-dimethyl-2-butene, 1-butene, 3-hexene, 2-ethyl-1-butene, 3-ethyl-3-hexene, 3,4-diethyl-3-hexene, 1,3-butadiene, 1,3,5-hexatriene, 2-vinyl-1,3-butadiene, 3-vinyl-1,3,5-hexatriene, 3,4-divinyl-1,3,5-hexatriene, 2-pentene, 2-methyl-1-butene, 2,3-dimethyl-2-pentene, 3-methyl-3-hexene, 3-ethyl-2-pentene, 3-methyl-4-ethyl-3-hexene, 2-methyl-3-ethyl-2-pentene, 2,3-dimethyl-3-hexene, isoprene, 1,3-pentadiene, 3-methyl-1,3-pentadiene, 4-methyl-1,3-pentadiene, 3,4-dimethyl-1,3-pentadiene, 3-methyl-1,3,5-hexatriene, 3-vinyl-1,3-pentadiene, 3-methyl-4-vinyl-1,3,5-hexatriene, 3-vinyl-4-methyl-1,3-pentadiene, 3,4-dimethyl-1,3,5-hexatriene, 1,3-hexadiene, 2-ethyl-1,3-butadiene, 3-ethyl-1,3-hexadiene, 4-ethyl-1,3-hexadiene, 3,4-diethyl-1,3-hexadiene, 3-vinyl-1,3-hexadiene, 3-ethyl-1,3,5-hexatriene, 3-ethyl-4-vinyl-1,3,5-hexatriene, 3,4-diethyl-1,3,5-hexatriene, 3-vinyl-4-ethyl-1,3-hexadiene, 3-methyl-1,3-hexadiene, 4-methyl-1,3-hexadiene, 3-ethyl-1,3-pentadiene, 3-ethyl-4-methyl-1,3-pentadiene, 3,4-dimethyl-1,3-hexadiene, 3-methyl-4-ethyl-1,3-hexadiene, 3-ethyl-4-methyl-1,3-hexadiene, 3-methyl-4-ethyl-1,3,5-hexatriene, 3-vinyl-4-methyl-1,3-hexadiene, 1,4-pentadiene, etc. Of these, ethylene, propylene, 1,3-butadiene, 1-butene, 2-butene and isobutylene are preferred.

The cyclic unsaturated hydrocarbon compounds in this invention include aromatic hydrocarbons such as benzene, toluene, ethylbenzene, propylbenzene, cumene, butylbenzene, xylene, ethyltoluene, cymene, diethylbenzene, triethylbenzene, tetramethylbenzene, styrene, methylstyrene, allylbenzene, divinylbenzene, 1-phenyl-1,3-butadiene and the like; and alicyclic unsaturated hydrocarbons such as cyclopentene, cyclopentadiene, fulvene, cyclohexene, methylcyclohexene, cyclohexadiene, cyclobutene, cyclooctatetraene, menthene, limonene, di-pentene, terpinolene, terpenene, phellandrene, sylvestrene, carene, pinene, bornene and the like, of which preferred are benzene, styrene, toluene, ethylbenzene, xylene, ethyltoluene, diethylbenzene and methylstyrene.

These hydrocarbon compounds are plasma-polymerizable substances which can be gasified in a plasma reaction system. These hydrocarbon compounds can be used alone or in admixture of two or more.

In this invention, a mixed gas consisting of a hydrocarbon and oxygen is used in the plasma polymerization. In this case, the mixed gas may further contain about 80 mole % or less, preferably 40 mole % or less, more preferably 20 mole % or less, of an inorganic gas other than oxygen gas such as, for example, hydrogen, carbon monoxide, carbon dioxide, water vapor, nitrogen, argon, helium, xenon, neon or the like. The molar ratio of the hydrocarbon to the oxygen is usually from 0.1 to 10, preferably from 0.2 to 6, more preferably from 0.2 to 4. When the molar ratio is less than 0.1, the rate of formation of a plasma polymerization product film is too slow to use the method in practice, and moreover the plasma polymerization product film is poor in durability. When the molar ratio exceeds 10, the plasma polymerization product film is overall insufficient in hydrophilicity and there exist local areas having no hydrophilicity.

The optical products to which this invention can be applied are such optical products as utilize the transmission, refraction or reflection of a light. They are, for example, mirrors having a convex surface, a concave surface, a plane surface or the like; lenses such as a contact lens, an intraocular lens, a spectacle lens, a camera lens, a Fresnel lens and the like; plane or curved surface glasses such as various window glasses and the like; and prisms such as a prism for single-lens reflex camera, a triangular prism and the like. Of these optical products, those utilizing the transmission or refraction of a light are made from transparent, organic, high molecular weight compounds, such as poly(halogenated)alkyl (meth)acrylates [e.g. polymethyl methacrylate, polycyclohexyl methacrylate, polyperfluoroalkylethyl methacrylate]; poly-(halogenated)aryl (meth)acrylates [e.g. polyphenyl methacrylate, polyhalogenated phenyl methacrylate]; polydiallyl compounds [e.g. polydiallyl diglycol carbonate, polydiallyl phthalate, polyadamantane diallyl]; poly-(halogenated)alkenyl compounds [e.g. polystyrene, polyhalogenated styrenes, polyvinyl chloride, polyvinylidene fluoride, polyethylene]; polydiacrylate compounds; polyimides; polyamides; polyurethanes; polysiloxane; transparent, inorganic high molecular weight compounds such as silicone; inorganic glasses such as lead glass, quartz glass; and transparent metal oxides such as indium oxide, tin oxide, indium tin oxide; and the like. Optical products utilizing the reflection of a light are made, for example, from such materials as having a mirror surface produced by vapor deposition of aluminum, tin, zinc, silver or the like, or by sputtering aluminum, tin, zinc, silver, nickel, copper or the like, or by plating nickel, chromium or the like; however, these materials are not critical. As the optical products utilizing the reflection of a light, those plastics, metals, ceramics, etc. which are generally employed are used. For these optical products, formation of a plasma polymerization product film is conducted on the mirror surfaces of the products.

The optical products to which this invention is applied may preliminarily be subjected to various treatments at the respective optical surfaces in order to impart various intended functions to the optical surfaces. Such treatments include (1) coating with various types of transparent polymers and (2) treatment with a plasma of a gas such as a hydrocarbon compound, a halogenated hydrocarbon compound, an organosilicon compound, hydrogen, nitrogen, helium, neon, argon, xenon or the like, or a plasma of a mixed gas of two or more of these gases.

The plasma polymerization conditions (e.g. degree of vacuum inside a reaction vessel, flow rate of a mixed gas, electric power for discharging, etc.) are similar to those employed in conventional plasma polymerizations and are not critical. However, as an example, a degree of vacuum inside a reaction vessel of 1 mTorr to 10 Torr may be used and a flow rate of a mixed gas of 0.1 to 100 cc (STP) may be used when the capacity of the reaction vessel is 50 liters. The electric power for discharging is preferably adjusted so that the electron temperature of the plasma as measured by the method described in U.S. Pat. No. 4,242,188 becomes 5,000° to 80,000° K. When the electron temperature is less than 5,000° K., the rate of formation of a plasma polymerization product film is too low to use the method in practice. When the electron temperature exceeds 80,000° K., the hydrophilicity of the plasma polymerization product film varies depending upon the position of the film and the durability of the film is inferior. In order to impart a higher durability to the plasma polymerization product film, the electric power for discharging is adjusted so that the electron temperature becomes 5,000° to 60,000° K. The plasma polymerization time varies depending upon the thickness of a plasma polymerization product film to be formed on an optical product. The plasma polymerization product film is not critical; however, a thickness of about 1 to 5,000 Å is usually sufficient. Hence, the plasma polymerization can be completed in a short time, for example, about 10 min.

In the plasma polymerization of this invention, an apparatus as shown in FIG. 1, for example, may be used. In the apparatus, a reaction vessel 1 connected to a vacuum pump (not shown in FIG. 1) is provided at an end having a small diameter with a coil 2; to the coil 2 is connected a high frequency power source 3; and an optical product S is supported on the supporting table 4 placed inside the reaction vessel 1. While evacuating the inside of the reaction vessel 1 by the vacuum pump, a mixed gas of a hydrocarbon and oxygen is introduced into the reaction vessel 1 through a gas inlet 5, and a high frequency voltage is then applied to the coil 2 from the power source 3 to generate a plasma inside the reaction vessel 1 and to allow the plasma to act upon the outer surface of the optical product S, thereby forming a plasma polymerization product film on the surface of the optical product S.

An apparatus shown in FIG. 2 may also be used. In this apparatus, a pair of electrodes 11 and 11' facing each other are provided inside the reaction vessel 10 constituted by a bell jar; between the electrodes 11 and 11' is held an optical product S; to the electrodes 11 and 11' is connected, for example, an AC power source 12 to generate a plasma between the electrodes 11 and 11'; the plasma is allowed to act upon the outer surface of the optical product S; thereby forming on the surface of the optical product S a plasma polymerization product film derived from the mixed gas of a hydrocarbon and oxygen. Incidentally, in FIG. 2, 13 is an exhaust gas pipe and 14 and 14' are conduits for reaction gas.

The apparatus used for the plasma polymerization of this invention is not restricted to those shown in FIGS. 1 and 2. For example, in the apparatus, the power source for plasma generation may be any of the DC and AC. When an AC is used, it may be of a low frequency, a high frequency or a microwave. In the case of a microwave, a method of coupling an amplifier with a plasma system may be of a ladder type, cavity type or the like. Further, the type of plasma-generating electrodes may be an induction type, a capacity type or the like and is not critical.

The optical product having a thin film on the surface according to this invention has the following advantages:

(1) The surface of the optical product has high hydrophilicity and accordingly the optical product is excellent in resistance to fogging due to adhesion of water drops, resistance to adhesion of air bubbles in the liquid phase, resistance to staining due to oils and fats, removability of stains due to oils and fats, etc.

(2) These characteristics do not change with the lapse of time, and the optical product is also excellent in durability.

(3) When the optical product is a contact lens, in its actual use, it has a good visual field, is excellent in movability on eye ball and ensures good oxygen supply to the cornea.

(4) When the optical product is an intraocular lens, the reduction in transparency due to adsorption of proteins, etc. is very low during the application of the lens.

This invention will be illustrated in more detail below referring to Examples; however, the Examples are by way of illustration only and not by way of restriction.

EXAMPLE 1

A reaction vessel as shown in FIG. 2 was used. On a supporting table in the reaction vessel was placed a polystyrene lens. While introducing into the reaction vessel a mixed gas of ethylene as a hydrocarbon and oxygen at an ethylene flow rate of 7.5 cc (STP)/min and an oxygen flow rate of 10 cc (STP)/min, the inside of the reaction vessel was kept at a degree of vacuum of 50 mTorr and an AC of 10 KHz was applied between two electrodes to generate a plasma having an electron temperature of 25,000°±3,000° K., whereby a reaction was allowed to take place over a period of 10 min and a plasma polymerization product film was formed on the surface of the polystyrene lens. In this case, the electron temperature of the plasma was measured using a heated probe (not shown in FIG. 2).

For the polystyrene lens having a thin film on the surface obtained by the above plasma polymerization, the contact angle of water on the surface of the polystyrene lens was measured by the water drop method. The change of the contact angle of water with the lapse of time was also measured for the same sample. The results are shown in Table 1.

The thickness of the plasma polymerization product film formed was obtained by placing, at the time of plasma polymerization, a silicon wafer next to the polystyrene lens and measuring the thickness of the plasma polymerization product film of the silicon wafer after plasma polymerization by the use of an ellipsometer (GAERTENER ® ELLIPSOMETER L Model 117). The thickness was 400±100 Å.

COMPARATIVE EXAMPLE 1

For the polystyrene lens before plasma polymerization and having no thin film on the surface which was used in Example 1, the contact angle of water and its change with the lapse of time were measured. The results are shown in Table 1.

EXAMPLE 2

Plasma polymerization was conducted in the same manner as in Example 1, except that the mixing ratio of ethylene/oxygen was changed to 5, whereby a polystyrene lens having a thin film on the surface was obtained. For this lens, the contact angle of water on the surface of the lens and its change with the lapse of time were measured. The results are shown in Table 1.

COMPARATIVE EXAMPLE 2

A plasma was allowed to act upon the surface of a polystyrene lens in the same manner as in Example 1, except that the flow rate of ethylene was changed to 0 cc (STP)/min. For the resulting polystyrene lens, the contact angle of water and its change with the lapse of time were measured. The results are shown in Table 1.

COMPARATIVE EXAMPLE 3

Plasma polymerization was conducted in the same manner as in Example 1, except that only ethylene [7.5 cc (STP)/min] was used and oxygen was not used. Then, ethylene supply was stopped and oxygen was allowed to flow at a rate of 10 cc (STP)/min, to allow the plasma to act upon the polystyrene lens. For the resulting polystyrene lens, the contact angle of water and its change with the lapse of time were measured. The results are shown in Table 1.

EXAMPLE 3

Plasma polymerization was conducted in the same manner as in Example 1, except that the mixing ratio (molar ratio) of ethylene/oxygen was changed to 0.2, whereby a polystyrene lens having a thin film on the surface was obtained. For the polystyrene lens, the contact angle of water and its change with the lapse of time were measured. The results are shown in Table 1.

EXAMPLE 4

Plasma polymerization was conducted in the same manner as in Example 1, except that the mixing ratio (molar ratio) of ethylene/oxygen was changed to 4, whereby a polystyrene lens having a thin film on the surface was obtained. For the polystyrene lens, the contact angle of water and its change with the lapse of time were measured. The results are shown in Table 1.

EXAMPLE 5

Plasma polymerization was conducted in the same manner as in Example 1, except that propylene was used as a hydrocarbon and the mixing ratio (molar ratio) of propylene/oxygen was 0.75, whereby a polystyrene lens having a thin film on the surface was obtained. For the polystyrene lens, the contact angle of water and its change with the lapse of time were measured. The results are shown in Table 1.

EXAMPLE 6

Plasma polymerization was conducted in the same manner as in Example 1, except that 1,3-butadiene was used as a hydrocarbon and the mixing ratio (molar ratio)

of 1,3-butadiene/oxygen was 0.75, whereby a polystyrene lens having a thin film on the surface was obtained. For the polystyrene lens, the contact angle of water and its change with the lapse of time were measured. The results are shown in Table 1.

EXAMPLE 7

Plasma polymerization was conducted in the same manner as in Example 1, except that 1-butene was used as a hydrocarbon and the mixing ratio (molar ratio) of 1-butene/oxygen was 0.75, whereby a polystyrene lens having a thin film on the surface was obtained. For the polystyrene lens, the contact angle of water and its change with the lapse of time were measured. The results are shown in Table 1.

EXAMPLE 8

Plasma polymerization was conducted in the same manner as in Example 1, except that isobutylene was used as a hydrocarbon and the mixing ratio (molar ratio) of isobutylene/oxygen was 0.75, whereby a polystyrene lens having a thin film on the surface was obtained. For the polystyrene lens, the contact angle of water and its change with the lapse of time were measured. The results are shown in Table 1.

EXAMPLE 9

Plasma polymerization was conducted in the same manner as in Example 1, except that benzene was used as a hydrocarbon and the mixing ratio (molar ratio) of benzene/oxygen was 0.75, whereby a polystyrene lens having a thin film on the surface was obtained. For the polystyrene lens, the contact angle of water and its change with the lapse of time were measured. The results are shown in Table 1.

EXAMPLE 10

Plasma polymerization was conducted in the same manner as in Example 1, except that styrene was used as a hydrocarbon and the mixing ratio (molar ratio) of styrene/oxygen was 0.75, whereby a polystyrene lens having a thin film on the surface was obtained. For the polystyrene lens, the contact angle of water and its change with the lapse of time were measured. The results are shown in Table 1.

EXAMPLE 11

Plasma polymerization was conducted in the same manner as in Example 1, except that an equimolar mixture of ethylene and benzene was used as a hydrocarbon and the mixing ratio (molar ratio) of the ethylene-benzene mixture/oxygen was 0.75, whereby a polystyrene lens having a thin film on the surface was obtained. For the polystyrene lens, the contact angle of water and its change with the lapse of time were measured. The results are shown in Table 1.

TABLE 1

| | Contact angle ($\theta°$) Days elapsed | | | | | | | |
|---|---|---|---|---|---|---|---|---|
| | 0 | 3 | 7 | 10 | 14 | 30 | 60 | 90 | 180 |
| Example | | | | | | | | | |
| 1 | 14 | 14 | 16 | 15 | 14 | 15 | 17 | 14 | 17 |
| 2 | 26 | 28 | 27 | 24 | 26 | 27 | 25 | 26 | 24 |
| 3 | 16 | 15 | 13 | 14 | 15 | 13 | 15 | 16 | 14 |
| 4 | 14 | 14 | 13 | 16 | 15 | 15 | 14 | 13 | 16 |
| 5 | 17 | 16 | 19 | 18 | 16 | 18 | 17 | 19 | 17 |
| 6 | 16 | 16 | 14 | 14 | 16 | 15 | 16 | 15 | 15 |
| 7 | 19 | 19 | 19 | 17 | 19 | 18 | 18 | 18 | 17 |

TABLE 1-continued

| | Contact angle ($\theta°$) Days elapsed | | | | | | | |
|---|---|---|---|---|---|---|---|---|
| | 0 | 3 | 7 | 10 | 14 | 30 | 60 | 90 | 180 |
| 8 | 17 | 18 | 18 | 16 | 18 | 17 | 16 | 18 | 18 |
| 9 | 17 | 17 | 19 | 18 | 16 | 17 | 15 | 17 | 18 |
| 10 | 16 | 15 | 15 | 14 | 16 | 15 | 16 | 17 | 14 |
| 11 | 15 | 15 | 14 | 16 | 17 | 17 | 18 | 16 | 16 |
| Comparative Example | | | | | | | | | |
| 1 | 87 | 89 | 90 | 88 | 88 | 91 | 89 | 92 | 89 |
| 2 | 15 | 22 | 31 | 29 | 36 | 45 | 43 | 46 | 51 |
| 3 | 17 | 23 | 28 | 30 | 37 | 43 | 45 | 49 | 55 |

EXAMPLE 12 and COMPARATIVE EXAMPLE 4

Plasma polymerization was conducted in the same manner as in Example 1, except that the polystyrene lens was replaced by (a) a contact lens produced by cutting a poly(methyl methacrylate) plate or (b) a disc produced in the same procedure as in the case of the contact lens, whereby a contact lens and a disc both having a thin film on the surface were obtained. The contact lens and the disc were tested for the following six items.

For Comparative Example 4, the contact lens and the disc (having no thin film on the surface) were tested for the same six items.

The results are shown in Table 2.

(1) Removability of stains due to oils and fats

A dried contact lens was immersed in water for 5 sec. Then, a cold cream was coated on the contact lens. The contact lens was held between the thumb and a forefinger, washed with water and then taken out of the water to observe adhesion of water drops to the contact lens. When the contact lens had no oil and was well wetted with water, it was rated as O. When the contact lens had an oil residue and repelled water, it was rated as X.

(2) Hydrophilicity

A dried contact lens was immersed in water for 5 sec. Then, it was taken out of the water to observe adhesion of water to the contact lens. When the contact lens was well wetted with water, it was rated as O. When the contact lens repelled water, it was rated as X.

(3) Visual field in actual use

The visual field of a contact lens in its actual use was rated. When the visual field was good, the contact lens was rated as O. When the visual field was cloudy, the contact lens was rated as X.

(4) Movability on eye ball in actual use

The movability of a contact lens in use by blinking was rated. When the contact lens moved well, it was rated as O. When the contact lens did not move well, it was rated as X.

(5) Durability of lens surface

A contact lens was held between the thumb and a forefinger, rubbed 2,000 times in water and then taken out of the water to observe adhesion of water drops to the contact lens. When the whole surface of the contact lens was well wetted with water, the contact lens was rated as O. When the surface repelled water, the contact lens was rated as X.

(6) Change of contact angle with the lapse of time

The change of the contact angle of water with the lapse of time was measured for a disc which had been allowed to stand in air.

EXAMPLE 13 and COMPARATIVE EXAMPLE 5

Plasma polymerization was conducted in the same manner as in Example 1, except that the polystyrene lens was replaced by a soft contact lens and a disc both produced by polymerizing a mixture consisting of 300 ml of acrylic acid, 280 ml of n-butyl methacrylate, 30 ml of ethylene glycol methacrylate and 6 ml of benzoin, cutting the resulting polymer into shapes of a contact lens and a disc and subjecting the shaped articles to esterification reaction in n-butyl alcohol, thereby obtaining a soft contact lens and a disc both having a thin film on the surface. The soft contact lens and the disc were tested in the same manner as in Example 12.

In Comparative Example 5, the soft contact lens and the disc before plasma polymerization of Example 13 were tested in the same manner as in Example 13.

The results are shown in Table 2.

EXAMPLE 14

Plasma polymerization was conducted in the same manner as in Example 1, except that the polystyrene lens was replaced by a contact lens and a disc both produced by cutting a poly(methyl methacrylate) plate and the ethylene was replaced by 1,3-butadiene, thereby obtaining a contact lens and a disc both having a thin film on the surface. The contact lens and the disc were tested in the same manner as in Example 12. The results are shown in Table 2.

of each lens due to adhesion of water drops to the surface of the lens. The results are shown in Table 3.

COMPARATIVE EXAMPLE 6

The same procedure as in each of Comparative Examples 1 to 3 was repeated, except that the polystyrene lens was replaced by a polycarbonate convex lens having a focal length of 5 cm, thereby obtaining 3 different convex lenses. These convex lenses were tested in the same manner as in Example 15.

The results are shown in Table 3.

TABLE 3

| | | Beam-condensing*2 ability of lens (Unit: arbitrary) | | |
|---|---|---|---|---|
| | Plasma conditions | After 1 min | After 2 min | After 5 min |
| Example 15 | Example | | | |
| | 1 | 10 | 9 | 10 |
| | 2 | 10 | 9 | 9 |
| | 3 | 10 | 10 | 10 |
| | 4 | 10 | 10 | 10 |
| | 5 | 10 | 9 | 10 |
| | 6 | 10 | 10 | 10 |
| | 7 | 10 | 9 | 10 |
| | 8 | 10 | 9 | 9 |
| | 9 | 10 | 9 | 9 |
| | 10 | 10 | 10 | 10 |
| | 11 | 10 | 9 | 10 |
| Comparative Example 6 | Comparative*1 Example | | | |
| | 1 | 4 | 2 | 3 |
| | 2 | 6 | 4 | 3 |
| | 3 | 6 | 3 | 3 |

Note:
*1Plasma treatment was not conducted.
*2Using a cylindrical measurement apparatus having a section as shown in FIG. 3

TABLE 2

| Test item | | Example 12 | Comparative Example 4 | Example 13 | Comparative Example 5 | Example 14 |
|---|---|---|---|---|---|---|
| (1) Removability of stains due to oils and fats | O | 10/10 | 0/10 | 10/10 | 0/10 | 10/10 |
| | X | 0/10 | 10/10 | 0/10 | 10/10 | 0/10 |
| (2) Hydrophilicity | O | 10/10 | 0/10 | 10/10 | 0/10 | 10/10 |
| | X | 0/10 | 10/10 | 0/10 | 10/10 | 0/10 |
| (3) Visual field in actual use | O | 10/10 | 9/10 | 10/10 | 1/10 | 10/10 |
| | X | 0/10 | 1/10 | 0/10 | 9/10 | 0/10 |
| (4) Movability on eye ball in actual use | O | 10/10 | 3/10 | 10/10 | 0/10 | 10/10 |
| | X | 0/10 | 7/10 | 0/10 | 10/10 | 0/10 |
| (5) Durability of surface | O | 10/10 | 0/10 | 10/10 | 0/10 | 10/10 |
| | X | 0/10 | 10/10 | 0/10 | 10/10 | 0/10 |
| (6) Change of contact angle with the lapse of time ($\theta°$) | 0 day | 16 | 92 | 18 | 88 | 14 |
| | 30 days | 18 | 90 | 20 | 90 | 18 |
| | 60 days | 18 | 90 | 20 | 90 | 18 |
| | 90 days | 19 | 92 | 20 | 89 | 20 |
| | 180 days | 19 | 89 | 22 | 92 | 18 |

Note: On test items (1)–(5), ten samples were tested in each case, and the results are shown by the number of samples rated as O or X.

EXAMPLE 15

The same procedure as in each of Examples 1 to 11 was repeated, except that the polystyrene lens was replaced by a polycarbonate convex lens with a focal distance of 5 cm to effect plasma polymerization under the same conditions as in each of Examples 1 to 11, thereby obtaining 11 different convex lenses each having a thin film on the surface. These convex lenses were kept for 10 min at a constant temperature of 50° C. and a constant humidity of 90% and then taken out into an atmosphere at 20° C. at a humidity of 40% to examine the degree of reduction in the beam-condensing ability whose inside surface is made black, light beams from a xenon lamp were condensed by a convex lens; the intensity of the condensed beams was measured by a photodiode; and the out-put voltage of the photodiode circuit was taken as the beam-condensing ability of the convex lens.

EXAMPLE 16

Plasma polymerization was conducted in the same manner as in Example 1, except that the polystyrene lens was replaced by a poly(methyl methacrylate) intraocular lens or a poly(methyl methacrylate) disc, thereby obtaining an intraocular lens and a disc both having a thin film on the surface.

Cornea lenses were taken out by a surgical operation from the eye balls of male rabbits weighing 3.0 to 3.5 kg and, into each atrium of the eye balls of these rabbits was inserted the above obtained intraocular lens having a thin film on the surface. After 3 months and 6 months of uses, the intraocular lens was taken out, water-washed, dried and measured for the transmission of a visible light to compare the stain of the intraocular lens before and after use. In this use test, 4 eyes (2 rabbits) were used per one measurement.

The transmission of a visible light was measured by using a double beam spectrophotometer, fixing an intraocular lens to a particular cell of 34 mm in height, 13 mm in width and 2 mm in thickness having a hole of 5 mm in diameter at the center, and measuring the transmission of a light through the intraocular lens at 500 nm. The transmission of the intraocular lens before use was taken as 100, and the transmissions after 3 months and 6 months of uses were reported as respective percentages relative to the transmission before use. The results are shown in Table 4.

For the above obtained disc having a thin film on the surface, the contact angle of water and its change with the lapse of time in air were measured. The results are shown in Table 5.

COMPARATIVE EXAMPLE 7

Using the same poly(methyl methacrylate) intraocular lens and the same poly(methyl methacrylate) disc as in Example 16 on which plasma polymerization product film had not been formed, the change of the transmission of a visible light in actual use by rabbits as well as the contact angle of water and its change with the lapse of time were measured in the same manner as in Example 16. The respective results are shown in Table 4 and Table 5.

EXAMPLE 17

Plasma polymerization was conducted in the same manner as in Example 16, except that the mixing ratio (molar ratio) of ethylene/oxygen was changed to 5, thereby obtaining a poly(methyl methacrylate) intraocular lens and a poly(methyl methacrylate) disc both having a thin film on the surface. For the lens and the disc, the change of the transmission of a visible light in actual use by rabbits as well as the contact angle of water and its change with the lapse of time were measured in the same manner as in Example 16. The respective results are shown in Table 4 and Table 5.

COMPARATIVE EXAMPLE 8

A plasma was allowed to act in the same manner as in Example 16, except that the flow rate of ethylene was changed to 0 cc (STP)/min. For the poly(methyl methacrylate) intraocular lens and the poly(methyl methacrylate) disc thus obtained, the change of the transmission of a visible light in actual use by rabbits as well as the contact angle of water and its change with the lapse of time were measured in the same manner as in Example 16. The respective results are shown in Table 4 and Table 5.

COMPARATIVE EXAMPLE 9

Plasma polymerization was conducted in the same manner as in Example 16, except that only ethylene was used as a flow rate of 7.5 cc (STP)/min. Then, the supply of ethylene was stopped and oxygen was supplied at a flow rate of 10 cc (STP)/min to allow an oxygen plasma to act, to obtain a poly(methyl methacrylate) intraocular lens and a poly(methyl methacrylate) disc both having a thin film on the surface. For the lens and the disc, the change of the transmission of a visible light in actual use by rabbits as well as the contact angle of water and its change with the lapse of time were measured in the same manner as in Example 16. The respective results are shown in Table 4 and Table 5.

TABLE 4

| | Transmission of a visible light (%) | | |
|---|---|---|---|
| | Before use | After 3 months of use | After 6 months of use |
| Example | | | |
| 16 | 100 | 98 | 97 |
| 17 | 100 | 97 | 97 |
| Comparative Example | | | |
| 7 | 100 | 92 | 82 |
| 8 | 100 | 96 | 84 |
| 9 | 100 | 94 | 81 |

TABLE 5

| | Contact angle ($\theta°$) Days elapsed | | | | |
|---|---|---|---|---|---|
| | 0 | 30 | 60 | 90 | 180 |
| Example | | | | | |
| 16 | 16 | 18 | 18 | 17 | 19 |
| 17 | 24 | 26 | 29 | 26 | 27 |
| Comparative Example | | | | | |
| 7 | 69 | 68 | 72 | 70 | 69 |
| 8 | 14 | 33 | 48 | 52 | 56 |
| 9 | 16 | 30 | 44 | 53 | 57 |

What is claimed is:

1. An optical product which utilizes the transmission, refraction or reflection of light and which has a thin film on its surface obtained by subjecting a mixed gas comprising oxygen and a hydrocarbon compound having at least one double bond in a molar ratio of the hydrocarbon compound to oxygen ranging from 0.1-10 to plasma polymerization in the presence of an optical product, thereby forming on said surface of the optical product a thin film of a reaction product of said plasma polymerization.

2. The optical product according to claim 1, wherein the hydrocarbon compound having at least one double bond is an unsaturated aliphatic hydrocarbon compound represented by the general formula:

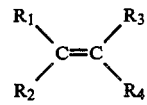

wherein $R_1$, $R_2$, $R_3$ and $R_4$, which may be the same or different, are hydrogen atoms, alkyl groups or alkenyl groups.

3. The optical product according to claim 2, wherein the unsaturated aliphatic hydrocarbon compound is at least one member selected from the group consisting of ethylene, propylene, 2-butene, isobutylene, 2-methyl-2-butene, 2,3-dimethyl-2-butene, 1-butene, 3-hexene, 2-ethyl-1-butene, 3-ethyl-3-hexene, 3,4-diethyl-3-hexene, 1,3-butadiene, 1,3,5-hexatriene, 2-vinyl-1,3-butadiene, 3-vinyl-1,3,5-hexatriene, 3,4-divinyl-1,3,5-hexatriene, 2-pentene, 2-methyl-1-butene, 2,3-dimethyl-2-pentene, 3-methyl-3-hexene, 3-ethyl-2-pentene, 3-methyl-4-ethyl- 3-hexene, 2-methyl-3-ethyl-2-pentene, 2,3-dimethyl-3-hexene, isoprene, 1,3-pentadiene, 3-methyl-1,3-pentadiene, 4-methyl-1,3-pentadiene, 3,4-dimethyl-1,3-pentadiene, 3-methyl-1,3,5-hexatriene, 3-vinyl-1,3-pentadiene, 3-methyl-4-vinyl-1,3,5-hexatriene, 3-vinyl-4-methyl-1,3-pentadiene, 3,4-dimethyl-1,3,5-hexatriene, 1,3-hexadiene, 2-ethyl-1,3-butadiene, 3-ethyl-1,3-hexadiene, 4-ethyl-1,3-hexadiene, 3,4-diethyl-1,3-hexadiene, 3-vinyl-1,3-hexadiene, 3-ethyl-1,3,5-hexatriene, 3-ethyl-4-vinyl-1,3,5-hexatriene, 3,4-diethyl-1,3,5-hexatriene, 3-vinyl-4-ethyl-1,3-hexadiene, 3-methyl-1,3-hexadiene, 4-methyl-1,3-hexadiene, 3-ethyl-1,3-pentadiene, 3-ethyl-4-methyl-1,3-pentadiene, 3,4-dimethyl-1,3-hexadiene, 3-methyl-4-ethyl-1,3-hexadiene, 3-ethyl-4-methyl-1,3-hexadiene, 3-methyl-4-ethyl-1,3,5-hexatriene, 3-vinyl-4-methyl-1,3-hexadiene and 1,4-pentadiene.

4. The optical product according to claim 1, wherein the hydrocarbon compound having at least one double bond is a cyclic unsaturated hydrocarbon compound.

5. The optical product according to claim 4, wherein the cyclic unsaturated hydrocarbon compound is an aromatic hydrocarbon.

6. The optical product according to claim 5, wherein the aromatic hydrocarbon is at least one member selected from the group consisting of benzene, toluene, ethylbenzene, propylbenzene, cumene, butylbenzene, xylene, ethyltoluene, cymene, diethylbenzene, trimethylbenzene, tetramethylbenzene, styrene, methylstyrene, allylbenzene, divinylbenzene and 1-phenyl-1,3-butadiene.

7. The optical product according to claim 4, wherein the cyclic unsaturated hydrocarbon compound is an alicyclic unsaturated hydrocarbon.

8. The optical product according to claim 7, wherein the alicyclic unsaturated hydrocarbon is at least one member selected from the group consisting of cyclopentene, cyclopentadiene, fulvene, cyclohexene, methylcyclohexene, cyclohexadiene, cyclobutene, cyclooctatetraene, menthene, limonene, di-pentene, terpinolene, terpenene, phellandrene, sylvestrene, carene, pinene and bornene.

9. The optical product according to claim 1, wherein the mixed gas comprising a hydrocarbon compound having at least one double bond and oxygen further contains 80 mole % or less of an inorganic gas other than oxygen.

10. An optical product according to claim 1 which is a contact lens or an intraocular lens.

11. The optical product according to claim 9, wherein said mixed gas further contains no more than 40 mole % of an inorganic gas other than oxygen.

12. The optical product according to claim 11, wherein the amount of said inorganic gas is no more than 20 mole % of said mixed gas.

13. The optical product according to claim 9, wherein said inorganic gas other than oxygen is hydrogen, carbon monoxide, carbon dioxide, water vapor, nitrogen, argon, helium, xenon or neon.

14. The optical product according to claim 1, wherein said molar ratio of hydrocarbon to oxygen ranges from 0.2 to 6.

15. The optical product according to claim 1, wherein said optical product which is coated with said film is formed of an organic or inorganic high molecular weight compound.

* * * * *